(12) United States Patent
Hou et al.

(10) Patent No.: US 8,459,435 B2
(45) Date of Patent: Jun. 11, 2013

(54) OPERATION PLATFORM FOR LOADING AND UNLOADING WORKPIECES

(75) Inventors: Fa-Da Hou, Shenzhen (CN); Bin Wang, Shenzhen (CN); Ga-Lei Hu, Shenzhen (CN); Chun-Nan Ou, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 346 days.

(21) Appl. No.: 12/977,073

(22) Filed: Dec. 23, 2010

(65) Prior Publication Data

US 2011/0303508 A1    Dec. 15, 2011

(30) Foreign Application Priority Data

Jun. 15, 2010   (CN) ...................... 2010 2 0226202 U (51) Int. Cl.
*B65G 13/00* (2006.01)

(52) U.S. Cl.
USPC ..................................... 193/35 SS; 198/782

(58) Field of Classification Search
USPC ............... 193/35 R, 35 SS; 198/782
See application file for complete search history.

(56) References Cited

U.S. PATENT DOCUMENTS

| | | | | |
|---|---|---|---|---|
| 3,394,822 A * | 7/1968 | Bethke | .......................... | 198/529 |
| 3,439,790 A * | 4/1969 | Edlund et al. | ............... | 193/35 R |
| 4,089,399 A * | 5/1978 | Webb | ......................... | 193/35 SS |
| 4,205,740 A * | 6/1980 | Hammond | .................. | 193/35 A |
| 4,357,128 A * | 11/1982 | Gooden et al. | ................ | 414/156 |
| 5,042,633 A * | 8/1991 | Jenkner | ....................... | 193/35 SS |
| 5,123,517 A * | 6/1992 | Windau | ..................... | 198/463.3 |
| 5,605,427 A * | 2/1997 | Hammond | .................. | 414/276 |
| 5,727,669 A * | 3/1998 | Rich, Jr. | ..................... | 198/468.6 |
| 6,382,385 B2 * | 5/2002 | Ransil et al. | ............... | 193/35 SS |
| 6,422,372 B2 * | 7/2002 | Ransil | ........................ | 193/35 SS |
| 6,786,318 B1 * | 9/2004 | Pace et al. | ................. | 193/35 SS |
| 7,237,667 B2 * | 7/2007 | Marcelli | ..................... | 193/35 SS |
| 7,296,674 B2 * | 11/2007 | Lawless et al. | ............... | 198/782 |
| 7,344,013 B2 * | 3/2008 | Krueger | ...................... | 193/35 R |
| 7,380,653 B2 * | 6/2008 | Anderson et al. | ............. | 198/782 |
| 7,717,252 B2 * | 5/2010 | Stewart | .......................... | 198/782 |
| 7,748,510 B2 * | 7/2010 | Greenwood et al. | ......... | 193/35 R |
| 8,256,608 B2 * | 9/2012 | McCormick et al. | ....... | 198/861.1 |

* cited by examiner

*Primary Examiner* — Douglas Hess
(74) *Attorney, Agent, or Firm* — Altis Law Group, Inc.

(57) ABSTRACT

An operation platform disposed on a substrate includes two guiding rail, two first driving devices, a carrying board and a second driving device. Each of the guiding rails includes a fixed bracket, a movable bracket and a plurality of rollers. The movable bracket received in the fixed bracket includes a pair of second sidewalls. Each second sidewall includes a plurality of bevels having a top portion and a bottom portion. The rollers positioned to the fixed bracket engage with the bevels to move perpendicularly to the substrate. The carrying board disposed on the guiding rails to support workpieces includes a plurality of supporting blocks. The first and second driving devices are used to drive the movable brackets and the carrying board respectively.

17 Claims, 7 Drawing Sheets

OPERATION PLATFORM FOR LOADING AND UNLOADING WORKPIECES

BACKGROUND

1. Technical Field

The present disclosure generally relates to operation platforms, and more particularly to an operation platform with two work stations.

2. Description of Related Art

During the manufacturing process of workpieces to be tooled, the workpieces need to be carried from a feeding station to an operation station on an operation platform. Generally, the operation platform comprises a plurality of sliding blocks, a guiding rail and a plurality of ball bearings connected between the sliding blocks and the guiding rail. The workpiece is supported on the sliding blocks. However, during the tooling process, a heavy load generated by tooling machine would bring pressure to bear on the workpiece and be forwarded to the sliding blocks and eventually damage the ball bearings or make the ball bearings move out from the guiding rail, leading to failure of the operation platform.

Therefore, a need exists in the industry to overcome the described problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
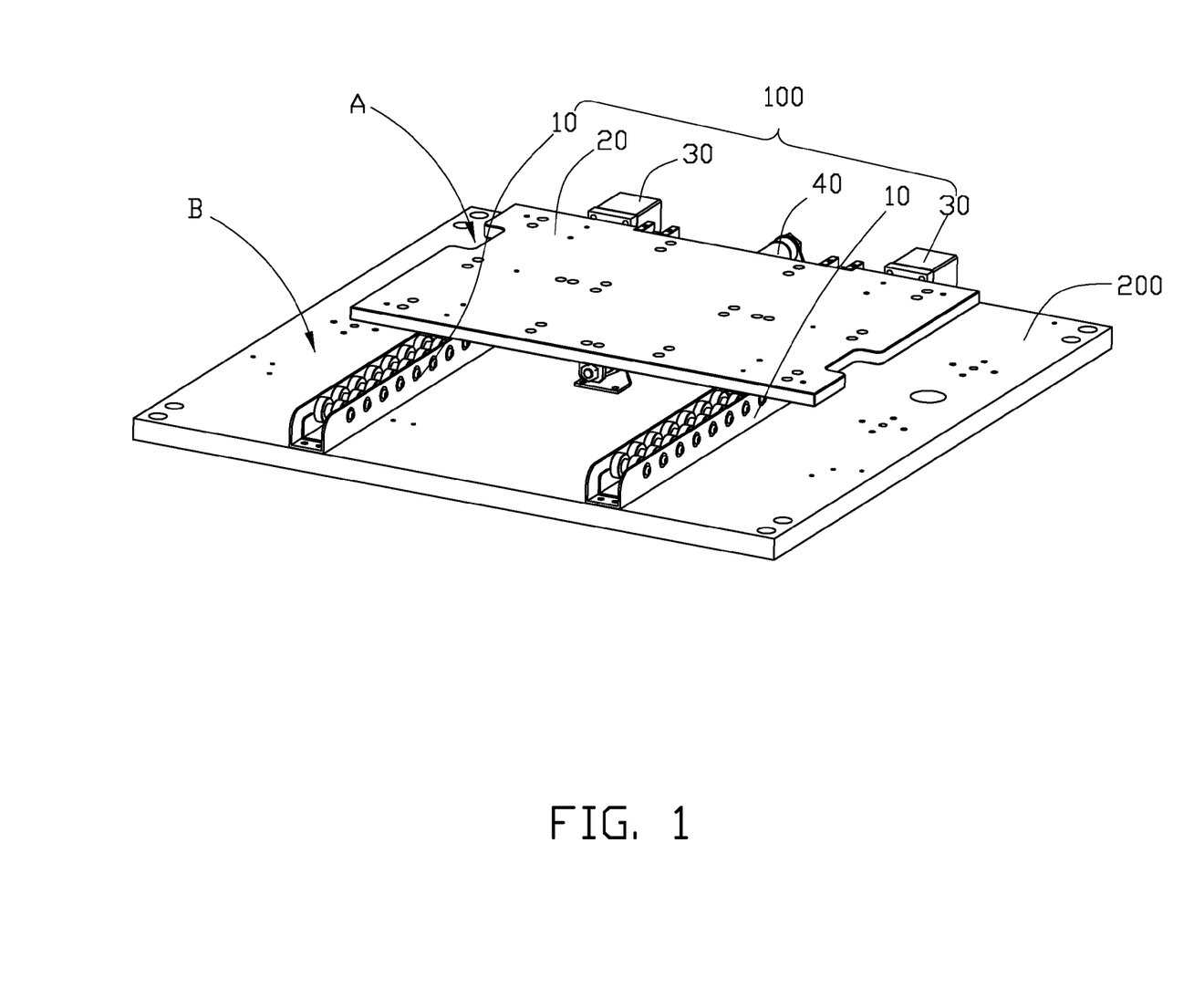
FIG. 1 is a perspective view of an operation platform of an exemplary embodiment of the disclosure, fixed on a substrate.
Figure 2:
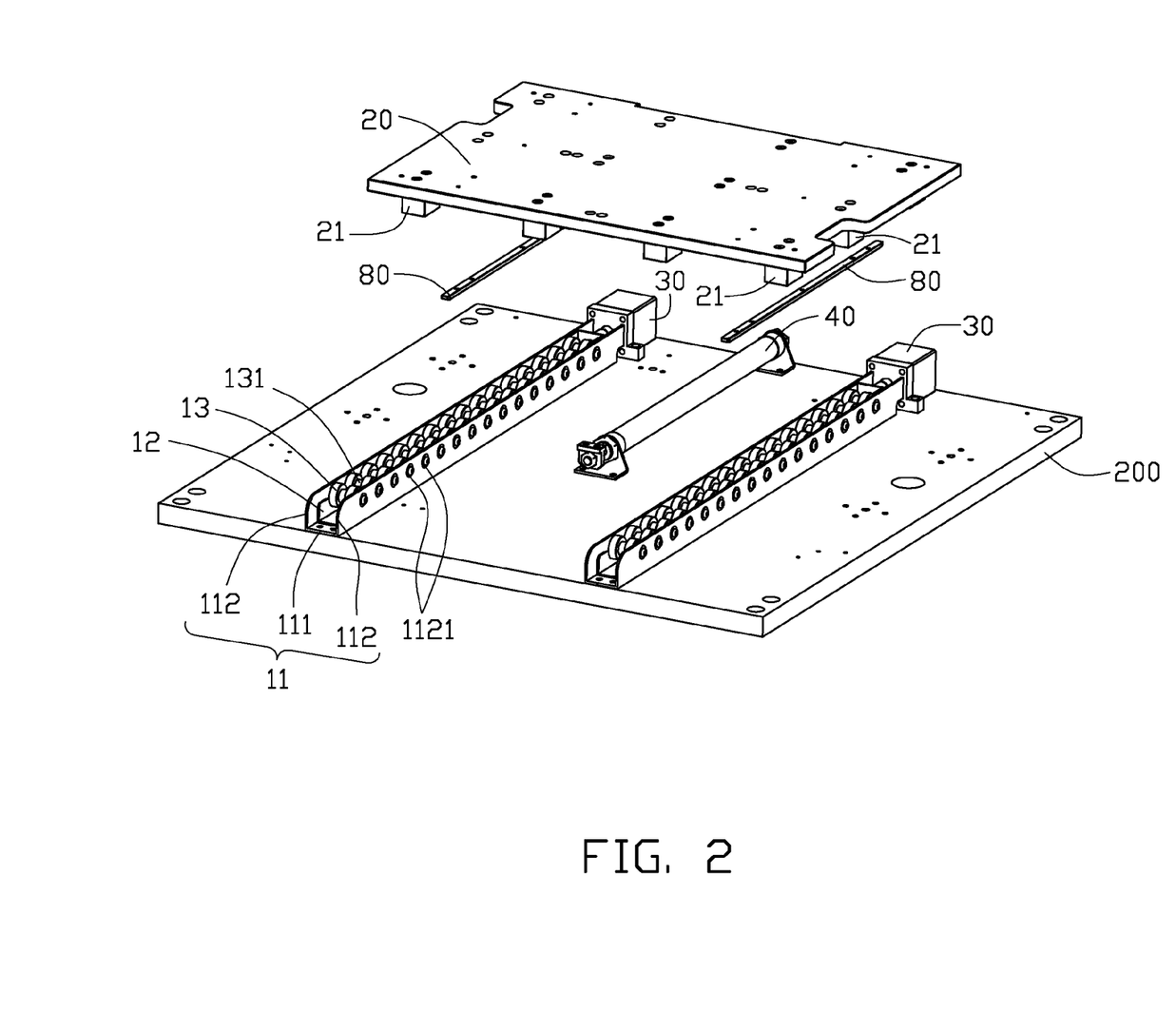
FIG. 2 is an exploded perspective view of FIG. 1.

Referring to FIG. 1 and FIG. 2, an operation platform 100 is disposed on a substrate 200 and used to carry workpieces (not shown) from a feeding station A to an operation station B. The operation platform 100 comprises two guiding rails 10 in parallel with each other, two first driving devices 30 each corresponding to one of the guiding rails 10, a carrying board 20 disposed on the two guiding rails 10 and a second driving device 40 to drive the carrying board 20. In this embodiment, the second driving device 40 is fixed on the substrate 200 and located between the two guiding rails 10. The feeding station A and the operation station B are respectively located two ends of the guiding rails 10. The two guiding rails 10 are fixed on the substrate 200 and capable to lift the carrying board 20 away from the substrate 200, so as to easily move the carrying board 20 between two ends of the guiding rails 10.

Each of the guiding rails 10 comprises a fixed bracket 11 fixed to the substrate 200, a movable bracket 12 received in the fixed bracket 11 and a plurality of rollers 13 received in the fixed bracket 11 and supported on the movable bracket 12. The movable bracket 12 moves in the fixed bracket 11 to lift the rollers 13 to protrude upwardly from the fixed bracket 11.

The fixed bracket 11 comprises a pair of first sidewalls 112 in parallel with each other. In this embodiment, the pair of first sidewalls 112 are integrated with a first bottom wall 111 of the fixed bracket 11 perpendicularly, and the first bottom wall 111 is fixed to the substrate 200 by, such as, screws. In this embodiment, each of the first sidewalls 112 defines a plurality of receiving holes 1121 arrange on a line parallel to the substrate 200.

Figure 3:
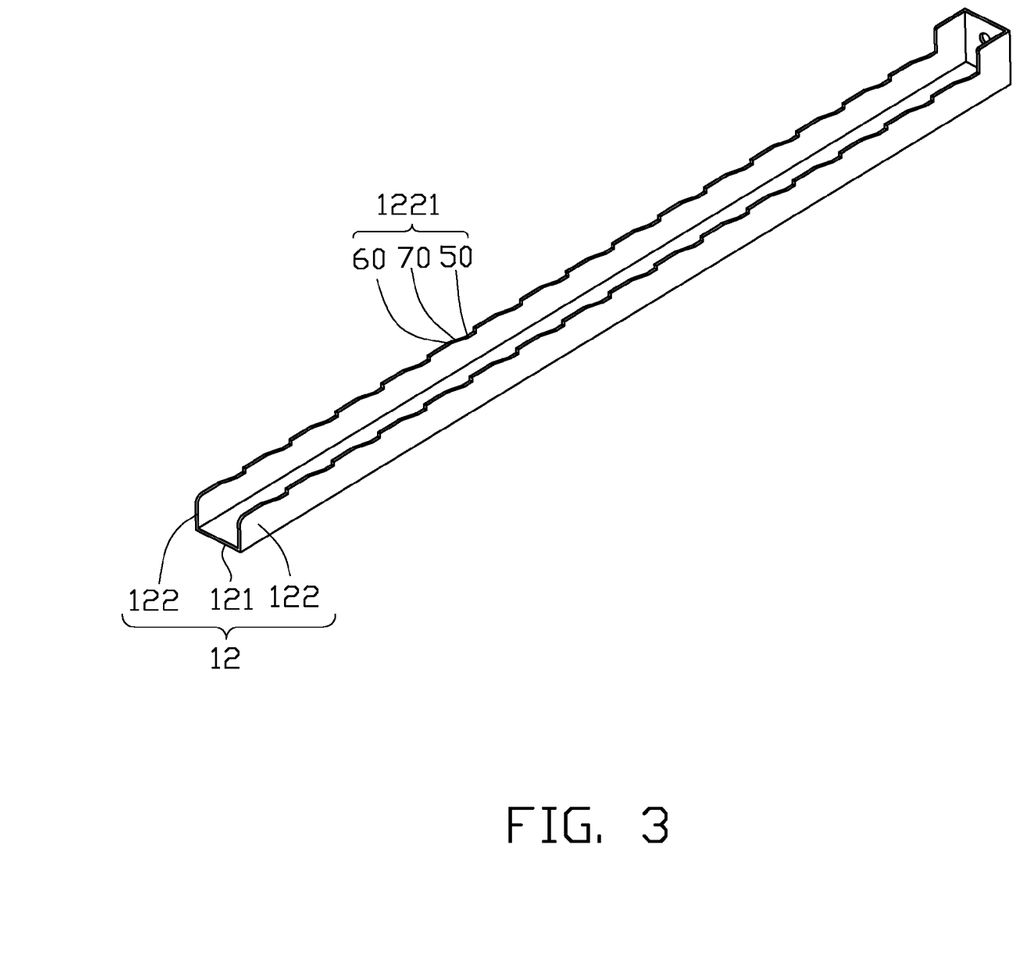
FIG. 3 is a perspective view of a movable bracket of the operation platform of FIG. 1.

Referring to FIG. 3, the movable bracket 12 is received between the pair of first sidewalls 112 and comprises a pair of second sidewalls 122 in parallel with each other and a second bottom wall 121 perpendicularly connected between the pair of second sidewalls 122. Each of the second sidewalls 122 defines a plurality of bevels 1221 arranged at regular intervals. Each of the bevels 1121 comprises a bottom portion 50, a top portion 60 and an inclining portion 70 disposed between the bottom portion 50 and the top portion 60. In the embodiment, the inclining portion 70 is configured at an angle to the substrate 200. In this embodiment, the bevels 1121 in the pair of first sidewalls 112 are corresponding one to one, and an angle between each inclining portion 70 and the substrate 200 is less than 45 degrees. In assembly, the movable bracket 12 is snugly received between the pair of first sidewalls 112. The plurality of bevels 1221 are corresponding to the plurality of receiving holes 1121, respectively.

Each of the rollers 13 is movably positioned to the pair of first sidewalls 112 and supported by the corresponding bevels 1221 to move relatively to the substrate 200. In this embodiment, two ends of each of the rollers 13 are positioned in the corresponding receiving holes 1121 of the pair of first sidewalls 112. The receiving holes 1121 are about elliptically shaped to limit the rollers 13 move along a direction substantially perpendicular to the substrate 200.

The carrying board 20 is disposed on the two guiding rails 10 to support workpieces and comprises a plurality of supporting blocks 21. The supporting blocks 21 are used to stand on the substrate 200 in the operation station B to support the carrying board 20 on the substrate 200. When the supporting blocks 21 stand on the substrate 200, the carrying board 20 is supported by the substrate 200. Therefore, in the operation station B, if the workpiece bear heavy loads, the heavy loads can be transferred from the carrying board 20 to the substrate 200, and protect the rollers 13 from being damaged by the heavy loads.

The first driving device 30 is fixed on the substrate 200 and used to drive the movable bracket 12 to move in and along the fixing bracket 11. The second driving device 40 is fixed on the substrate 200 and used to drive the carrying board 20 to move along the guiding rails 10.

In this embodiment, the operation platform 100 further comprises a pair of guiding strips 80 fixed to the carrying board 20 and matching with the pair of guiding rails 10 to maintain stable movement of the carrying board 20 on the guiding rails 10. Each of the rollers 13 defines a recess 131 configured at a middle portion thereof, in which the guiding strips 80 are received and moves.

Figure 4:
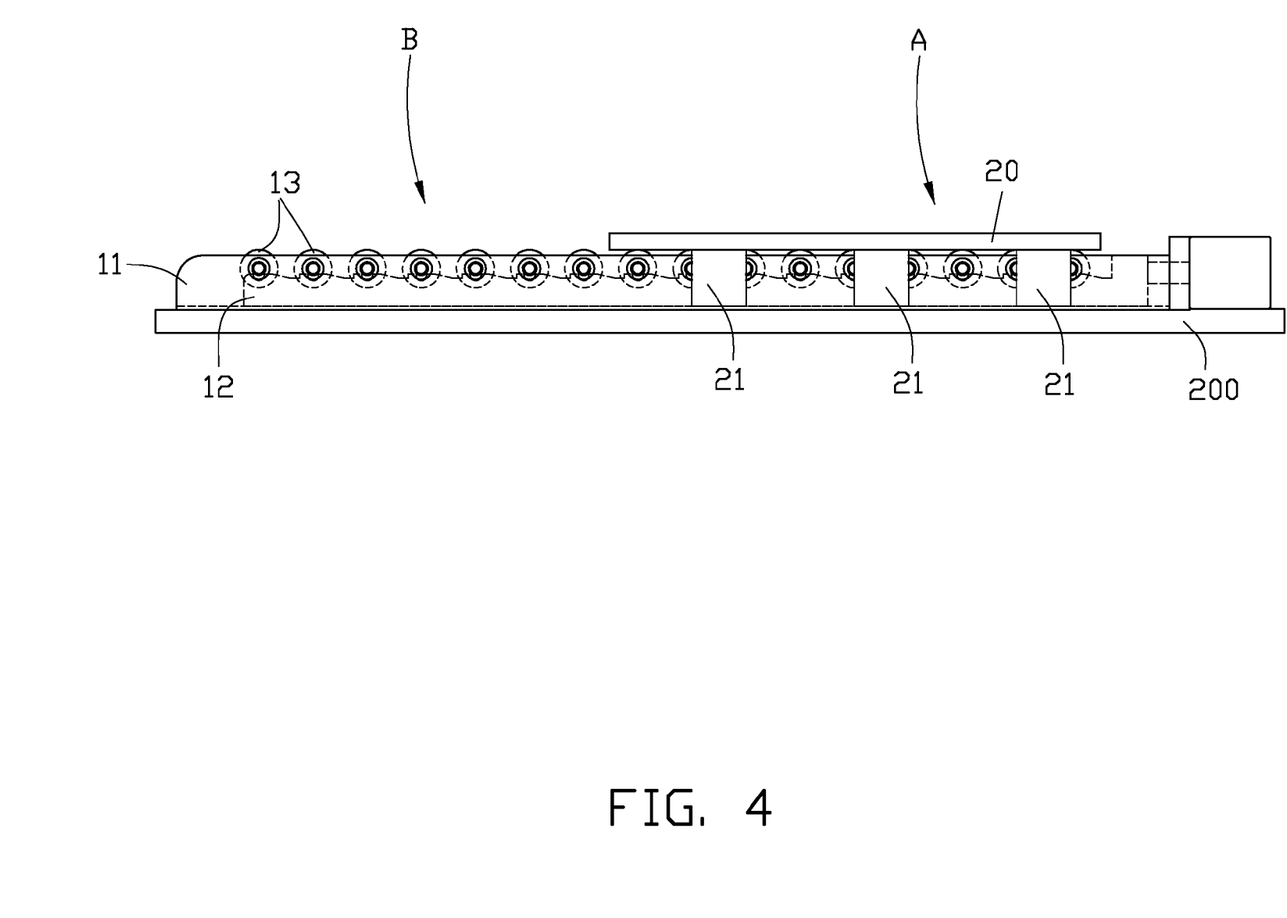
FIG. 4 is a schematic drawing of the operation platform of FIG. 1 working in a feeding station.
Figure 5:
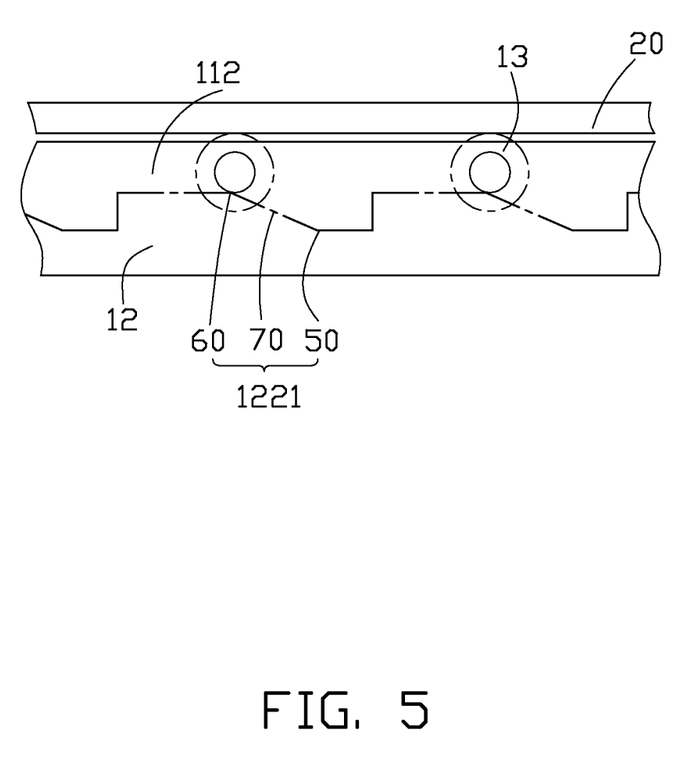
FIG. 5 is a partial, enlarged schematic drawing of FIG. 4, showing relationships between a fixed bracket, the movable bracket, a plurality of rollers and a carrying board.

Referring to FIGS. 4-5, the operation platform 100 works in the feeding station A. In the feeding station A, the movable bracket 12 moves in and along the fixing bracket 11, and the bevels 1221 move relatively to the rollers 13 to drive the rollers 13 move away from the substrate 200 in the receiving holes 1121 respectively. In other words, relative movements between the bevels 1221 and the rollers 13 lead the rollers 13 move to contact the top portions 60 of the bevels 1221 and protrude upwardly from the fixed bracket 11 to hold the carrying board 20 up and away from the substrate 200. When the carrying board 20 is away from the substrate 200, the second driving device 40 drives the carrying board 20 move on the rollers 13 to carry the workpiece on the carrying board 20 to the operation station B.

Figure 6:
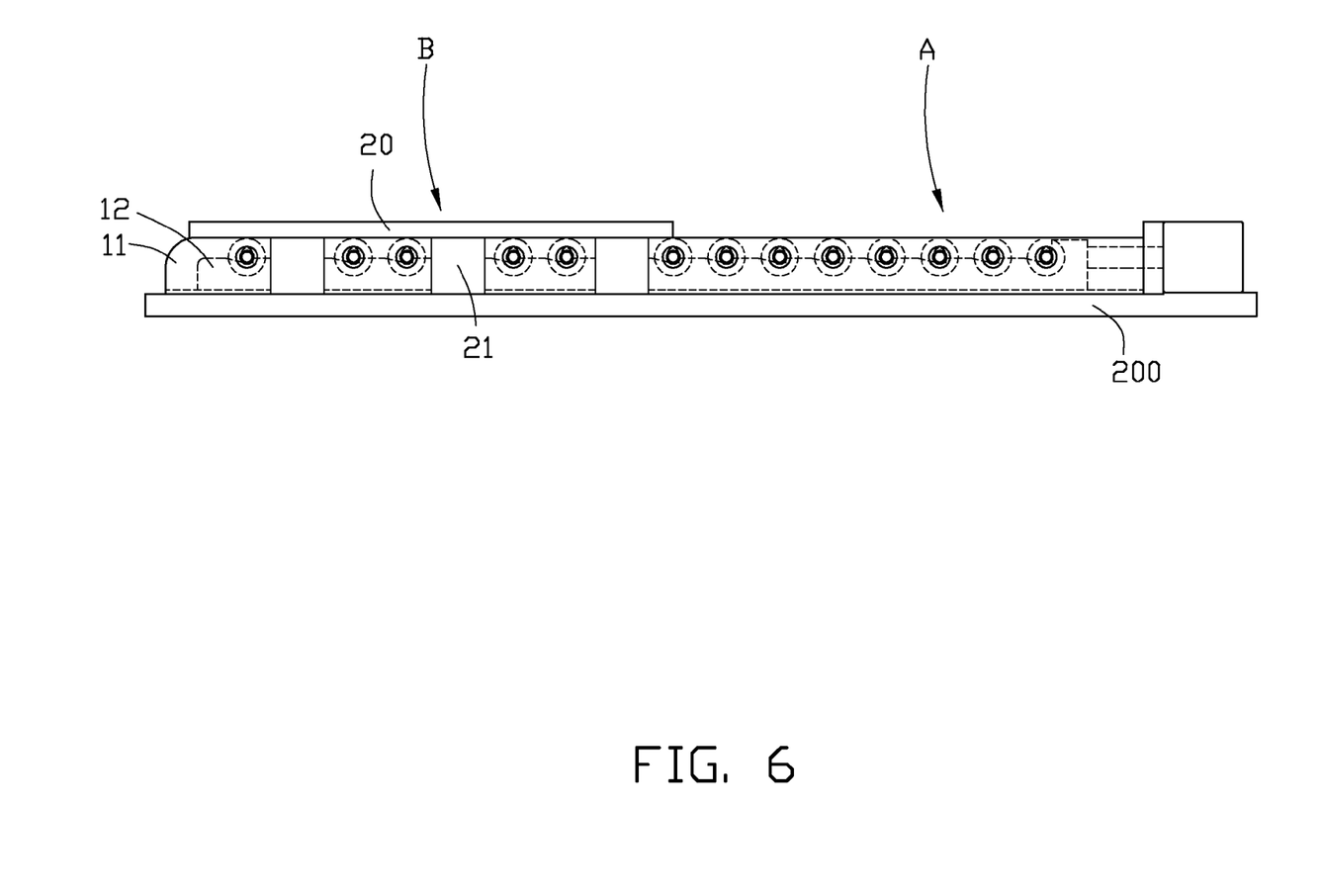
FIG. 6 is a schematic drawing of the operation platform of FIG. 1 working in an operation station.
Figure 7:
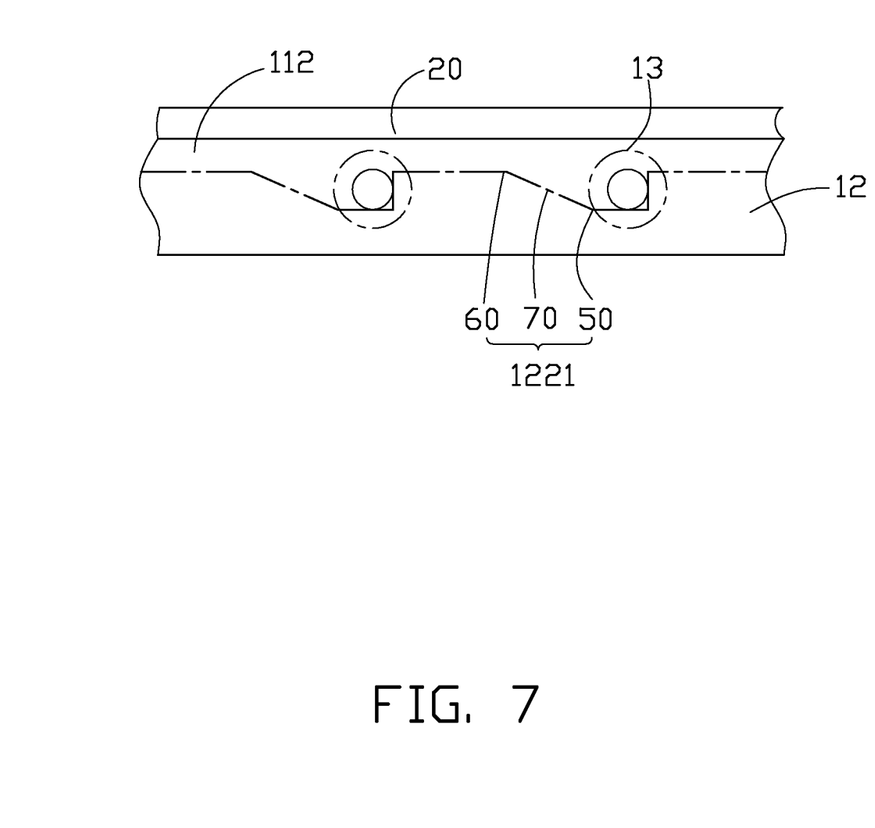
FIG. 7 is a partial, enlarged schematic drawing of FIG. 6, showing relationships between the fixed bracket, the movable bracket, the plurality of rollers and the carrying board.

Referring to FIGS. 6-7, the operation platform 100 works in the operation station B. The movable bracket 12 drives the rollers 13 move toward the substrate 200 in the receiving holes 1121 respectively. The rollers 13 move down to contact the bottom portions 50 of the bevels 1221, and make the plurality of supporting blocks 21 of the carrying board 20 contact the substrate 200. Therefore, in the operation station B, all loads on the workpiece can be borne on the substrate 200, and the rollers 13 are rest in the fixing bracket 11, and cannot be damaged by the huge loads.

In summary, the carrying board 20 is lifted away from the substrate 200 or fall down to stand on the substrate 200 by relative movements between the bevels 1221 and the rollers 13.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An operation platform, disposed on a substrate to carry a workpiece from a feeding station to an operation station, the operation platform comprising:
   two guiding rails, each comprising a fixed bracket, a movable bracket and a plurality of rollers, the fixed bracket fixed on the substrate comprising a pair of first sidewalls opposite to each other, the movable bracket received between the pair of first sidewalls and comprising a pair of second sidewalls opposite to each other, each of the second sidewalls defining a plurality of bevels, each of the bevels comprising a top portion and a bottom portion, each of the rollers movably positioned to the pair of first sidewalls and supported by the corresponding bevels to move relatively to the substrate;
   two first driving devices, used to drive the movable brackets to move in the fixing brackets;
   a carrying board, disposed on the two guiding rails to support the workpiece, and comprising a plurality of supporting blocks; and
   a second driving device, used to drive the carrying board to move along the guiding rails;
   wherein in the feeding station, the movable bracket moves to drive the rollers move away from the substrate to contact the top portions of the bevels, so as to hold the carrying board up and away from the substrate;
   wherein in the operation station, the movable bracket moves to drive the rollers move toward the substrate to contact the bottom portions of the bevels, and make the supporting blocks of the carrying board contact the substrate.

2. The operation platform as claimed in claim 1, wherein the plurality of bevels are arranged at regular intervals.

3. The operation platform as claimed in claim 1, wherein each of the first sidewalls defines a plurality of receiving holes, two ends of each of the rollers are positioned in one corresponding pair of the receiving holes to be limited move along a direction substantially perpendicular to the substrate.

4. The operation platform as claimed in claim 1, further comprising a pair of guiding strips fixed to the carrying board and match with the guiding rails to maintain stable movement of the carrying board on the guiding rails.

5. The operation platform as claimed in claim 4, wherein each of the rollers defines a recess configured at a middle portion thereof, in which the guiding strips are received and moves.

6. The operation platform as claimed in claim 1, wherein each of the bevels comprises an inclining portion disposed between the bottom portion and the top portion.

7. The operation platform as claimed in claim 6, wherein an angle between each inclining portion and the substrate is less than 45 degrees.

8. The operation platform as claimed in claim 1, wherein the second driving device is fixed on the substrate and located between the two guiding rails.

9. An operation platform, disposed on a substrate, the operation platform comprising:
   a carrying board, comprising a plurality of supporting blocks to stand on the substrate;
   two guiding rails, fixed on the substrate and capable to lift the carrying board away from the substrate so as to move the carrying board along the guiding rails; and
   a pair of guiding strips fixed to the carrying board and match with the guiding rails to maintain stable movement of the carrying board on the guiding rails;
   wherein each of the two guiding rails comprises a fixed bracket fixed on the substrate, a movable bracket received in the fixed bracket and a plurality of rollers received in the fixed bracket and supported on the movable bracket, the movable bracket moves in the fixed bracket to lift the rollers to protrude upwardly from the fixed bracket;
   wherein each of the rollers defines a recess configured at a middle portion thereof, in which the guiding strips are received and moves.

10. The operation platform as claimed in claim 9, wherein each of the fixed brackets comprises a pair of first sidewalls in parallel with each other and a first bottom wall integrated with the first sidewalls and fixed to the substrate, and the movable bracket received between the pair of first sidewalls.

11. The operation platform as claimed in claim 10, wherein each of the first sidewalls defines a plurality of receiving holes arrange on a line parallel to the substrate, two ends of each of the rollers are positioned in the corresponding receiving holes to be limited move along a direction substantially perpendicular to the substrate.

12. The operation platform as claimed in claim 11, wherein each of the movable brackets comprises a pair of second sidewalls in parallel with each other, each of the second sidewalls defines a plurality of bevels corresponding to the plurality of receiving holes to support the corresponding rollers.

13. The operation platform as claimed in claim 12, wherein each of the bevels comprises a bottom portion, a top portion and an inclining portion disposed between the bottom portion and the top portion, the rollers move to contact the top portion to lift the carrying board away from the substrate, the rollers move to contact the bottom portion to make the carrying board stand on the substrate.

14. The operation platform as claimed in claim 13, wherein an angle between each inclining portion and the substrate is less than 45 degrees.

15. The operation platform as claimed in claim 9, further comprising two first driving devices used to drive the movable brackets to move in the fixing brackets.

16. The operation platform as claimed in claim 9, further comprising a second driving device, used to drive the carrying board to move on the guiding rails.

17. The operation platform as claimed in claim 9, wherein the second driving device is fixed on the substrate and located between the two guiding rails.

* * * * *